UNITED STATES PATENT OFFICE.

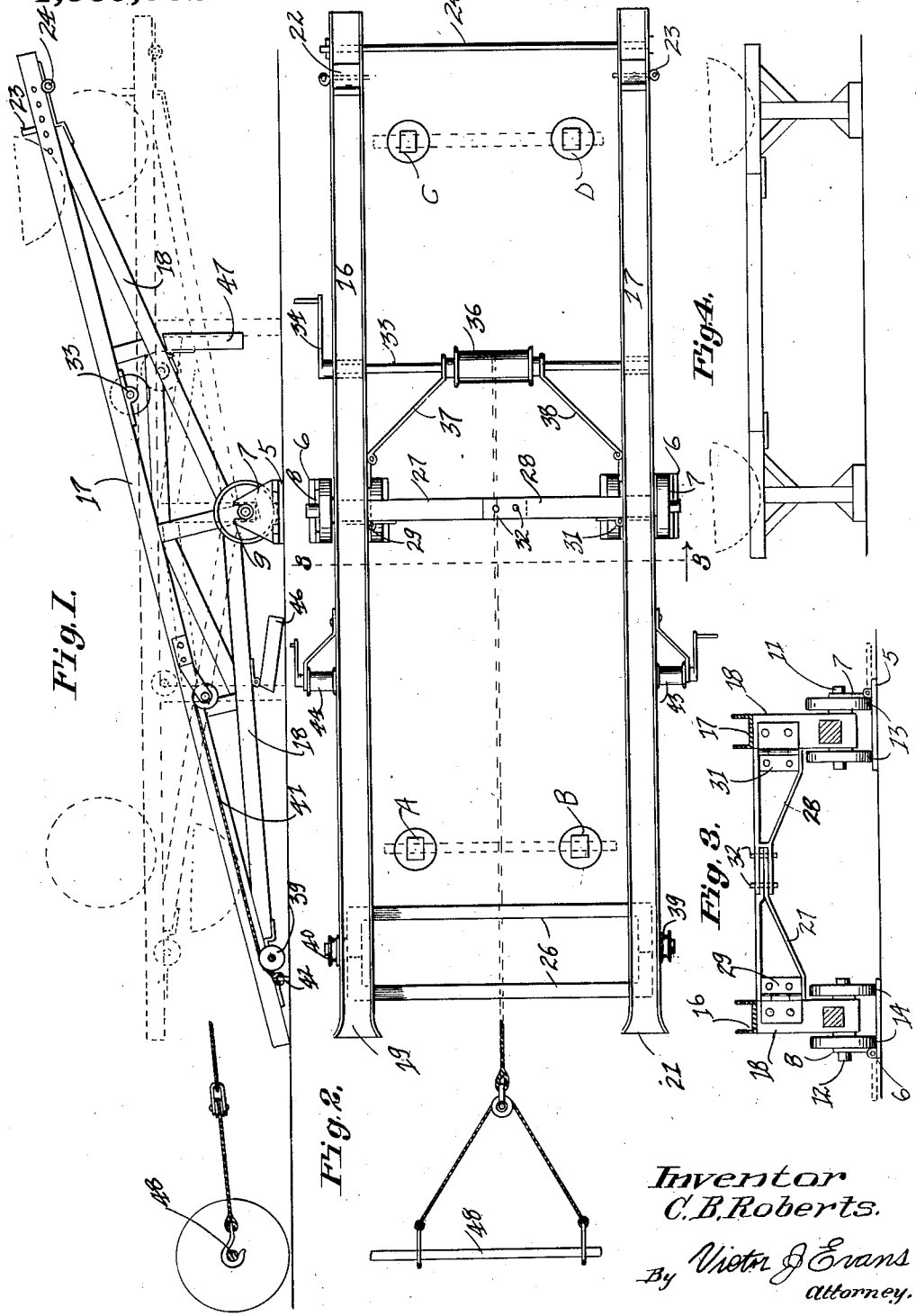

CHARLES B. ROBERTS, OF BERKELEY, CALIFORNIA.

VEHICLE-LIFT.

1,389,532.  Specification of Letters Patent.  Patented Aug. 30, 1921.

Application filed February 12, 1921. Serial No. 444,423.

*To all whom it may concern:*

Be it known that I, CHARLES B. ROBERTS, a citizen of the United States, residing at Berkeley, in the county of Alameda and State of California, have invented new and useful Improvements in Vehicle-Lifts, of which the following is a specification.

This invention relates to improvements in vehicle lifts.

The principal object of this invention is to provide means for raising a vehicle to a predetermined height where said vehicle may be maintained while being worked upon or while in storage. This lift may also be used for the purpose of raising vehicles on to elevated platforms such as railway stations, freight cars and the like.

Another object of this invention is to provide means whereby the elevating mechanism may be so arranged that jacks may be placed under a car and the elevating mechanism removed leaving the car resting upon the jacks.

Additional objects of this invention are portability, ease of operation controlled tilting simplicity of construction and compactness in the arrangement of its parts.

In the accompanying drawings forming a part of this specification, and in which like numerals are employed to designate like parts throughout the same.

Figure 1 is a side elevation of my improved vehicle lift.

Fig. 2 is a top plan view of Fig. 1.

Fig. 3 is a cross-section taken on line 3—3 of Fig. 2.

Fig. 4 is a fragmentary detail view showing a supplemental elevated support.

It is well known that in most garages where a pit is not employed, the mechanic who is called upon to work beneath the car has to lie upon his back, which is a difficult position to assume, resulting in slow work, and it is also well known that a pit is unsatisfactory as it forms a place for accumulation of trash. With my invention I allow the mechanic to work upon the under side of a car without having to lie upon his back and at the same time to do away with the pin.

In the accompanying drawings wherein for the purpose of illustration is shown a preferred embodiment of my invention, the numerals 5 and 6 refer to plates secured to the floor of a garage a suitable distance apart, and each provided with a latch as shown at 7 and 8. The shape of latches is best shown in Fig. 1 wherein it will be noted that a recess 9 is formed therein for the purpose of engaging the shafts 11 and 12 upon which wheels 13 and 14 are mounted. These wheels serve to transport the vehicle lifting mechanism as will be later seen.

The numerals 16 and 17 refer to channel-shaped tracks which are supported upon the wheels 13 and 14 through suitable bracing, represented as whole by the numeral 18. The tracks 16 and 17 are flared at one end as shown at 19 and 21 and are provided with movable stops 22 and 23 at their opposite ends.

A cross-bar 24 is provided at one end and is removable, the purpose of which will be later seen. Suitable braces 26 are provided at the opposite ends of the tracks and are permanently secured thereto. At 27 and 28 I have shown braces substantially midway of the length of the track 16 and 17, which are hinged as at 29 and 31 and held in engagement one with the other by pins 32. These braces may be swung upon their pivots 29 and 31 by removing the pins 32, the purpose of which will be hereinafter described.

The numeral 33 refers to a shaft journaled to the underside of the tracks 16 and 17 and provided with a handle 34 at one end and a spool 36 near its center portion. Suitable hinged braces 37 and 38 are provided, which serve to keep the spool 36 suitably positioned upon the shaft 33.

By referring to Figs. 1 and 2, it will be noted that pulleys 39 and 40 as provided, over which a cable 41 may pass having one of its ends attached to a ring 42 in the garage floor and having its opposite end about a spool, such as shown at 43 and 44. These spools are adapted to be rotated by suitable handles.

Pivoted legs 46 and 47 are provided for supporting the elevating structure as a whole against tipping after a car has been placed thereon.

The numeral 48 diagrammatically represents the rear axle of a car, around which a cable is hooked and the opposite end is adapted to be wound upon the spool 36. In the operation of my device, the whole is assembled, as shown in Figs. 1 and 2, and a cable attached to the car to be placed thereon. The handle 34 is then rotated, which winds the cable upon the spool 36 drawing the car on to the inclined tracks 16 and 17 until the wheels of the car have reached the stops 22 and 23.

During this time the elevating mechanism as a whole is prevented from movement through its attachment to the floor by the latches 7 and 8 and is prevented from tipping through the cable 41 passing over the pulley 39 and having its end attached to the ring 42 in the floor. By now releasing the cable 41, the elevated end will move downwardly until the leg 47 comes in contact with the floor, after which time the leg 46 can be swung to its vertical position, and will prevent backward movement of the structure.

Should it be desired to move the vehicle from the elevated position to some distant spot, the latches 7 and 8 may be dropped, as shown in dotted lines in Fig. 3 and the whole moved to any distant point. Where the vehicle might be rolled on a stationary, supplemental elevated support, the elevating mechanism could then be used for raising other vehicles. Should it be desired to work on the car while it is upon the elevated mechanism, the bar 24 may be removed, also the shaft 33 and spools 36. The braces 37 and 38 could then be swung against the tracks 16 and 17 and the braces 27 and 28 could be swung upon their pivots 29 and 31 by removing the pins 32. By this action access can be readily had to the whole underneath part of the vehicle.

Should it now be desired to remove the elevating mechanism, jacks as shown at A, B, C and D could be inserted beneath the axles of the car and then the mechanism as a whole could be withdrawn without disturbing the jacks.

It will thus be seen that I have invented a device which has many advantages while used about a garage and one which will be cheap to construct, simple to operate and a time saver from the standpoint of labor by speeding up repair operations.

It will be understood that the form of my invention herewith shown and described, is to be taken as a preferred example of the same, and that various changes in the shape, size and arrangement of parts may be resorted to without departing from the spirit of the invention, or the scope of the subjoined claims.

Having thus described my invention, I claim:

1. In a device of the character described, parallel tracks, means for securing said tracks one to the other at one end, removable means for securing said tracks to each other at their opposite ends, pivoted braces substantially midway of said tracks, a shaft mounted between said tracks, a spool mounted on said shaft, pivoted braces secured to said tracks and abutting said spool, means for rotating said spool, and means for holding said tracks in an inclined position for the purpose of moving a vehicle thereon.

2. In a device of the character described, plates adapted to be secured to the floor of a garage, shafts having wheels thereon, latches carried upon said plates and adapted to engage said shafts, suitable braces carried on said shafts and adapted to support tracks spaced one from the other, rigid means for securing said tracks at one end and removable means for securing said tracks at their opposite ends, pivoted braces mounted between said track securing means, and means for controlling the elevation of said tracks and for moving a vehicle thereon.

In testimony whereof I affix my signature.

CHARLES B. ROBERTS.